United States Patent [19]
Bradley

[11] 4,078,624
[45] Mar. 14, 1978

[54] MODULAR WEIGHING APPARATUS

[75] Inventor: Chester D. Bradley, Darien, Conn.

[73] Assignee: The A. H. Emery Company, New Canaan, Conn.

[21] Appl. No.: 741,768

[22] Filed: Nov. 15, 1976

[51] Int. Cl.² .............................................. G01G 5/04
[52] U.S. Cl. .................................. 177/128; 177/134; 177/209; 177/255
[58] Field of Search ............... 177/254, 255, 208, 209, 177/199, 200, 134, 128

[56] References Cited

U.S. PATENT DOCUMENTS

| 2,742,278 | 4/1956 | Carleton | 177/255 X |
| 2,835,484 | 5/1958 | Bradley | 177/209 |
| 3,123,166 | 3/1964 | Schellentrager | 177/211 |
| 3,933,212 | 1/1976 | Bradley | 177/209 |

Primary Examiner—Joseph W. Hartary
Attorney, Agent, or Firm—St. Onge, Steward, Johnston, Reens & Noe

[57] ABSTRACT

A weighing apparatus comprises a plurality of weighing apparatus modules, each of which includes an elongated platform structure under which lies an elongated frame structure. A load cell is interposed between a downwardly directed area of the platform structure and an upwardly directed area of the frame structure in the region of one end of both structures. A bracing arrangement, which resists relative horizontal movement of the platform and frame structures but permits relative vertical movement, includes a pair of parallel mechanical linkages, one of which is connected at one end to the platform structure adjacent the load cell and at the other end to the frame at a location spaced away from the load cell. For stability, the other mechanical linkage is connected in reverse fashion, namely, at one end to the frame structure adjacent the load cell and at the other end to the platform structure at a location spaced away from the load cell. Similar modules are assembled to form a single rectangular weighing apparatus, with one load cell at each corner by upper and lower tie plates which respectively link adjacent module frame structures and platform structures.

12 Claims, 9 Drawing Figures

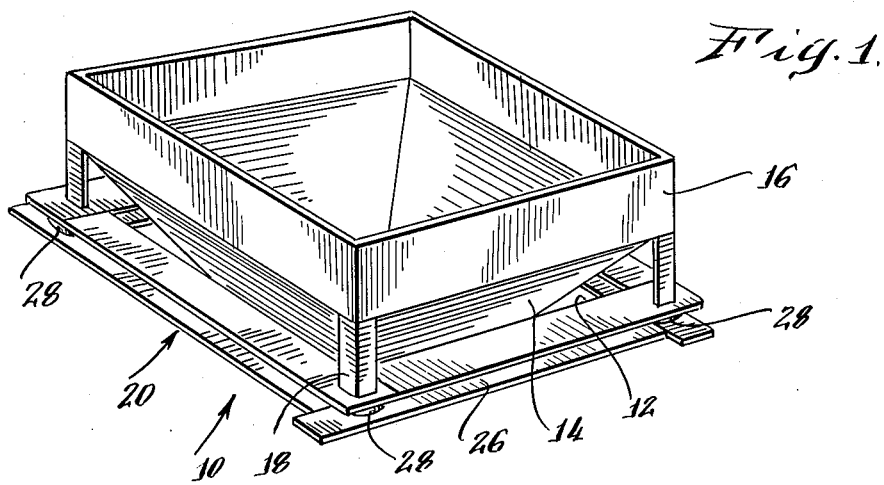
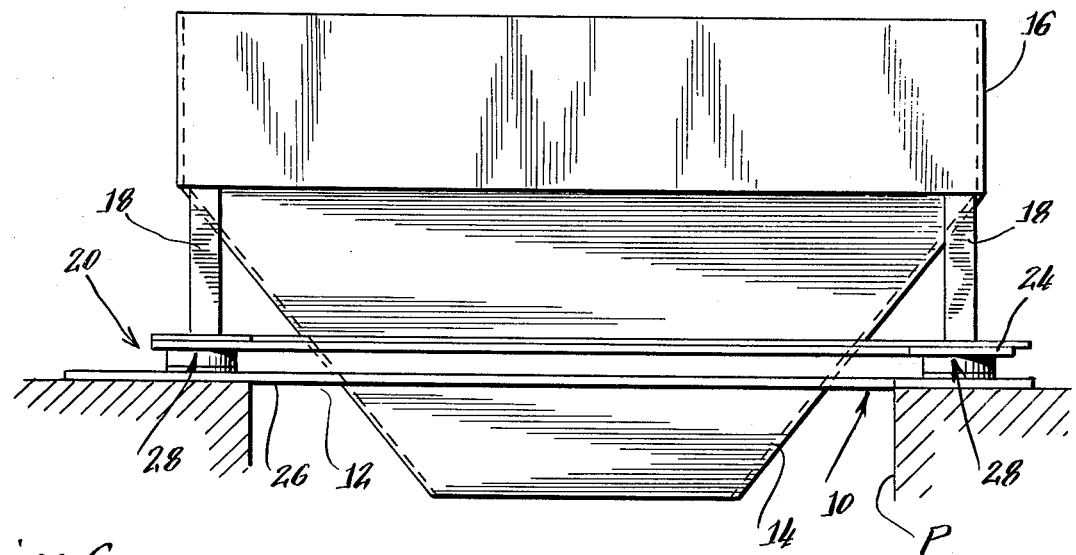
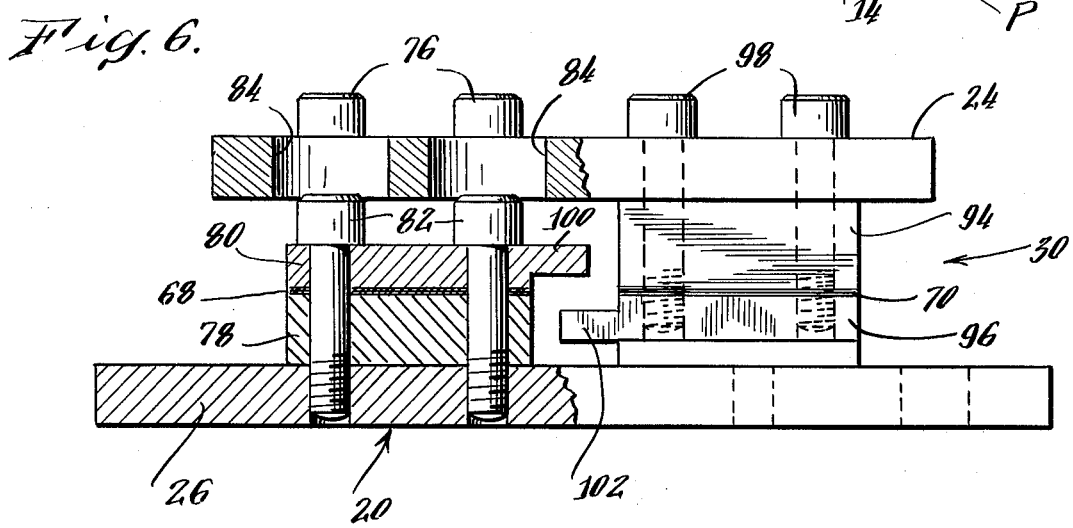

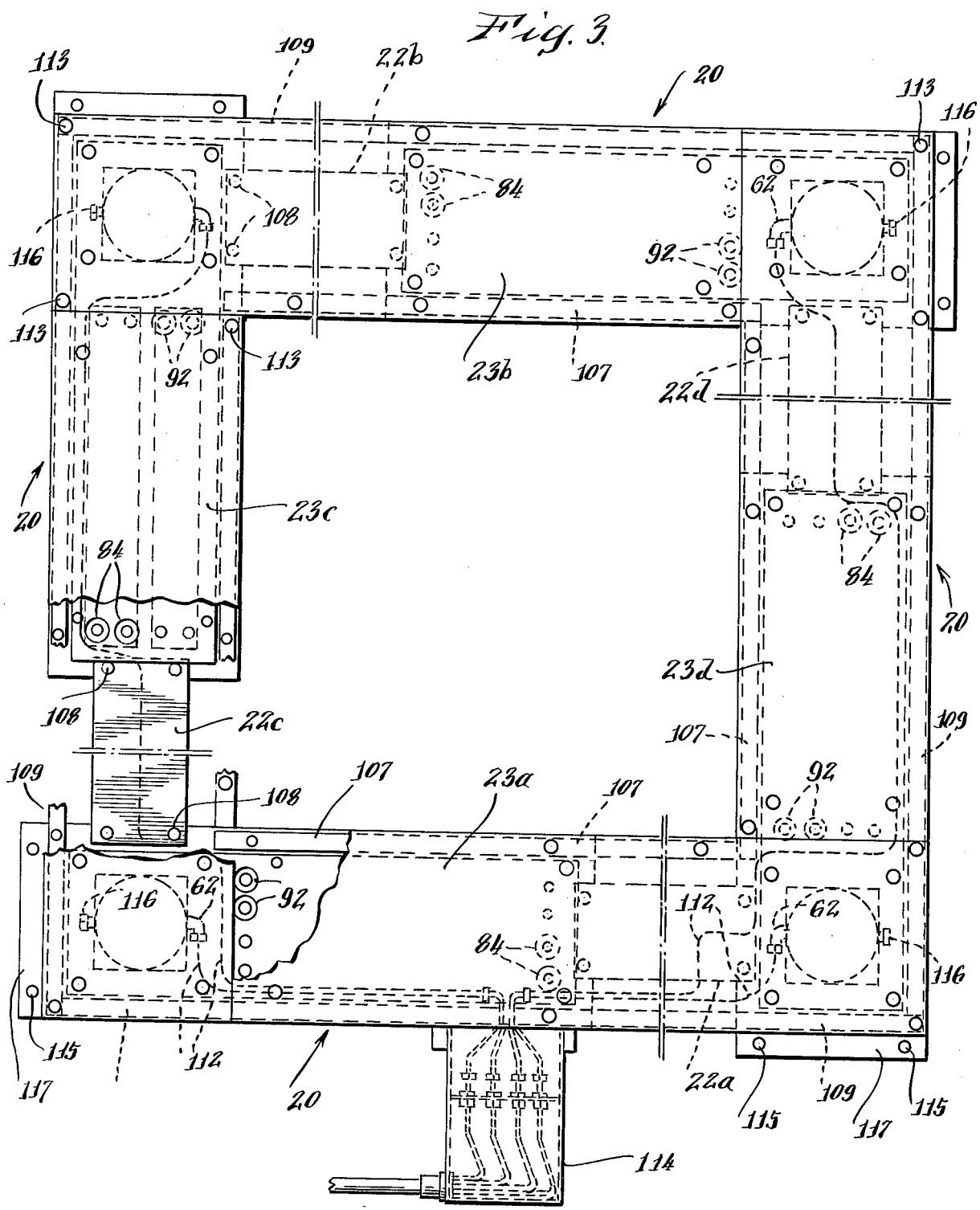

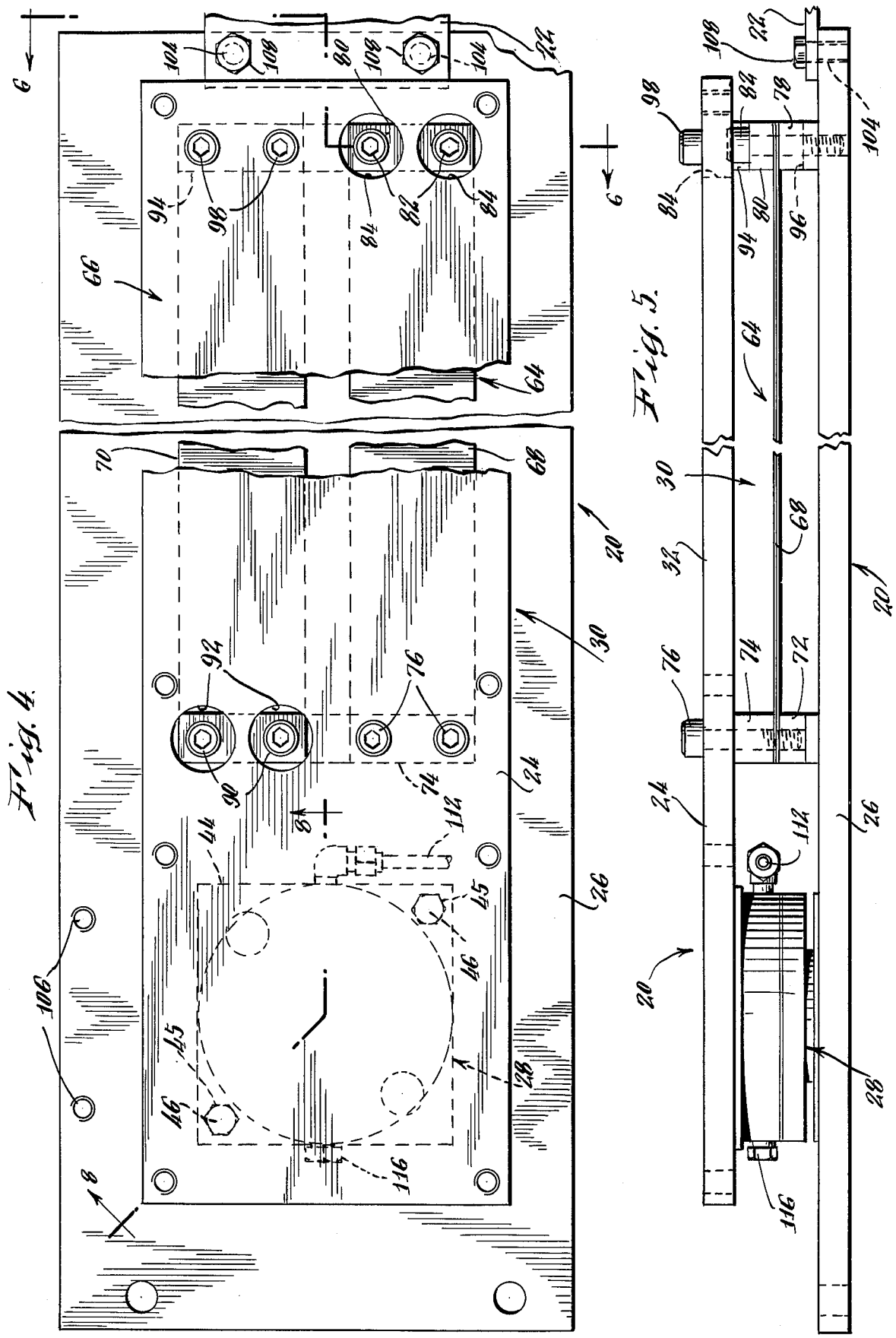

MODULAR WEIGHING APPARATUS

BACKGROUND OF THE INVENTION

1. Field of the Invention

The present invention relates to a weighing apparatus that can be used to weigh many different types of loads but which is particularly well adapted to weigh a load carried in a container such as a hopper or tote bin. The weighing apparatus may, for example, have a central hole which accommodates a depending hopper chute. Alternatively, the apparatus may be adapted to have an upper platform for supporting a load at any location thereon.

For optimum versatility, weighing apparatus of the type described above should have a high weighing capacity. Moreover, for convenience of use, they can be made portable, not requiring special permanent installations.

It is also desirable to provide a weighing apparatus which can be readily adapted to various applications which require different weighing surface dimensions.

2. Description of the Prior Art

Many types of weighing apparatus are known. For example, U.S. Pat. No. 3,933,212 (Bradley et al.), assigned to the assignee of the present invention, discloses a high capacity platform weighing apparatus having an extremely low profile to permit the weighing surface to be easily mounted by a loaded truck. Furthermore, this apparatus offers little obstruction to the area in which it is installed. The weighing apparatus includes an underlying frame structure having a superposed platform structure. A plurality of load cells are mounted between the two structures at spaced locations. The attachment of the cells to these structures permits easy installation, disassembly, and maintenance. A ramp in the form of a truncated pyramid surrounds the platform structure so that the weighing surface can be mounted from any side. The platform and frame structures are constrained to move relative to each other only in the vertical direction by a bracing arrangement.

The platform weighing apparatus disclosed in the Bradley et al. Patent has many features which make it superior to similar apparatus. However, the platform and frame structure is of fixed size. Therefore, a given apparatus constructed in accordance with the invention cannot be readily adapted to weighing applications requiring a platform surface of different size.

Other weighing devices are disclosed in U.S. Pat. No. 3,299,976 (Boadle et al.), British patent specification No. 1,060,838 and French Pat. No. 1,508,241.

SUMMARY OF THE INVENTION

In a preferred embodiment to be described below in detail, the weighing apparatus of the present invention is assembled from a plurality of weighing apparatus modules each of which defines an independent self-contained weighing device. These modules may be interconnected by attachment devices having various sizes to permit easy assembly of a unitary weighing apparatus of virtually any weighing surface size desired. Moreover, by interchanging the attachment devices interconnecting the modules in existing weighing apparatus, the weighing surface size may conveniently be varied at the apparatus operating location in the field. Thus, it is unnecessary to maintain several separate weighing apparatus for different applications.

The modular design of the weighing apparatus of the present invention also permits easy maintenance and repair with minimum of downtime. Specifically, if one load cell or its support structure requires repair or routine maintenance, it can be removed from the remainder of the apparatus and an auxiliary unit can be immediately substituted for it. Thus, operation of the apparatus need not be long delayed.

In the preferred embodiment, each weighing apparatus module comprises a rectangular, elongated platform structure having a planar upper surface. A generally rectangular elongated frame structure underlies this platform structure and a load cell is interposed between a downwardly directed area of the platform structure and an upwardly directed area of the frame structure in the region of one end of both structures. A bracing arrangement is also interposed between the respective structures to resist horizontal displacement but to permit vertical displacement of the platform structure relative to the frame structure. This bracing arrangement includes a first mechanical linkage, that is flexible in the vertical direction but substantially inflexible in the horizontal direction, which has a first fixed connection to the frame structure in the region of the load cell and a second fixed connection to the platform structure in the region of the opposite end of both structures. A second mechanical linkage, also flexible in the vertical direction but substantially inflexible in the horizontal direction, extends in mutually parallel relation to the first mechanical linkage and is connected in a reverse manner to the respective platform and frame structures. That is, this second linkage has a first fixed connection to the platform structure in the region of the load cell and a second fixed connection to the frame structure in the region of the other end of both the platform and frame structures.

These modules are interconnected by tie plates so that the load cell is located at a corner of the assembled unitary weighing apparatus. An upper support plate may span the distance between the respective modules to form a weighing surface on which loads are placed or the support plate may be omitted permitting the open space between the modules to accommodate a load carrying container.

In addition to providing advantages in terms of the ease of maintenance and adaptability to specific applications, the weighing apparatus of the present invention is also characterized by a extremely low profile. Moreover, the apparatus has a large load bearing capacity.

Accordingly, it is an object of the present invention to provide a modular weighing apparatus which is both easy to maintain and repair but is also easy to adapt to specific weighing applications.

Other objects, aspects, and advantages of the present invention will be pointed out in, or understood from, the following detailed description provided below in conjunction with the accompanying drawings.

BRIEF DESCRIPTION OF THE DRAWINGS

FIG. 1 is a perspective view of the fully assembled weighing apparatus of the present invention on which a load carrying hopper is installed.

FIG. 2 is a side elevational view of this weighing apparatus and the hopper.

FIG. 3 is a top plan view of the apparatus illustrating four modules attached together.

FIG. 4 is an enlarged top plan view of one weighing apparatus module.

FIG. 5 is a front elevational view of this module.

FIG. 6 is a side elevational view of this module.

DETAILED DESCRIPTION OF THE PREFERRED EMBODIMENTS

Figure 7:
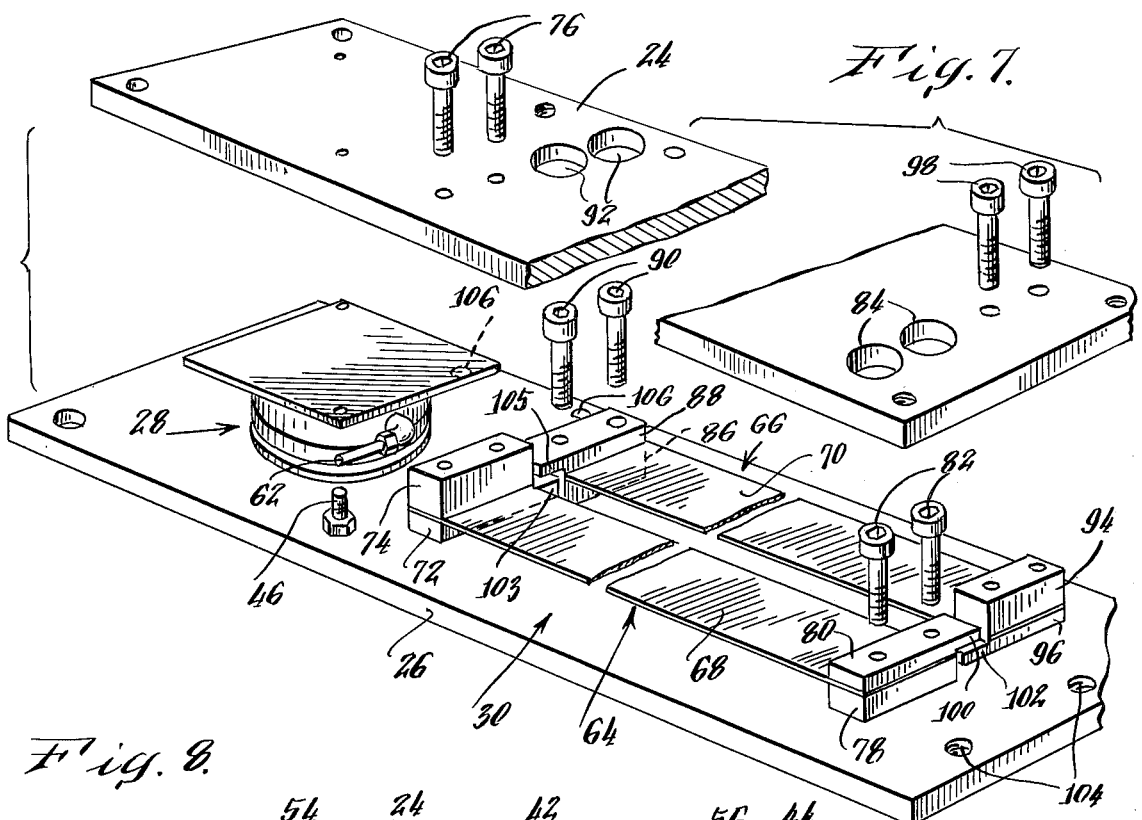
FIG. 7 is an exploded perspective view of the module showing the interrelationship of the mechanical linkages in the bracing arrangement.

FIGS. 1 and 2 illustrate a weighing apparatus which is an assembly of four weighing apparatus modules constructed in accordance with the present invention. These modules can be arranged with appropriate tying members of different size to vary the size of the apparatus or they can be removed and replaced for repair or maintenance.

The assembled weighing apparatus, generally indicated at 10, is an open rectangle in top elevation mounted at the periphery of a pit P. In this form it defines a rectangular central opening 12 which may accommodate a chute 14 having the shape of an inverted pyramid of a large load carrying hopper 16. The hopper has four supporting legs 18 each of which rests on one corner of the weighing apparatus.

Alternatively, the weighing apparatus may be mounted on a base such as a floor and may be equipped with a solid top platform spanning the opening 12 and side ramps such as those shown in U.S. Pat. No. 3,933,212 (Bradley). In this form, the apparatus can be used as a platform weighing bridge for wheeled load-carrying vehicles. In either form, the resulting configuration of the weighing apparatus has a very low profile, as can be seen in FIG. 2.

The manner of assembly of four modules to form the platform weighing apparatus described above is illustrated in detail in FIGS. 3 and 9. Each module, generally indicated at 20, is attached to two other modules by two tie plates 22 and 23 in a manner to be described in greater detail below, so that two modules together form two sides and one corner of the rectangular weighing apparatus. Thus, all together, the four modules form rectangular boundaries of the main apparatus assembly.

FIGS. 4 through 7 show a weighing apparatus module 20 in detail and since all four are identical, description of one will serve to describe all. The module 20 includes a main platform structure 24 in the form of an elongated, rectangular platform preferably made of structural steel having thickness of approximately ½ inch. Completely underlying the platform structure is a frame structure 26 in the form of an elongated, larger rectangular plate preferably made of structural steel and also having thickness of approximately ½ inch. A load cell 28, which is preferably of the hydraulic type and will be described below in detail, is mounted between the platform and frame structures in the region of one end of both and is adapted to be vertically compressed when a load is received on the platform structure 24. Of course, the load cell need not be of the hydraulic type but may instead be, for example, electrical.

The respective platform and frame structures are held in mutually parallel relation for relative vertical movement but limited horizontal movement by a bracing arrangement, generally indicated at 30 and also described below in detail. When the apparatus is set up for operation, the frame structure is placed directly on a supporting base such as a floor so that the platform structure may receive vertical loads which effect downward movement to compress the load cell 28 but which effect little or no horizontal movement.

Figure 8:
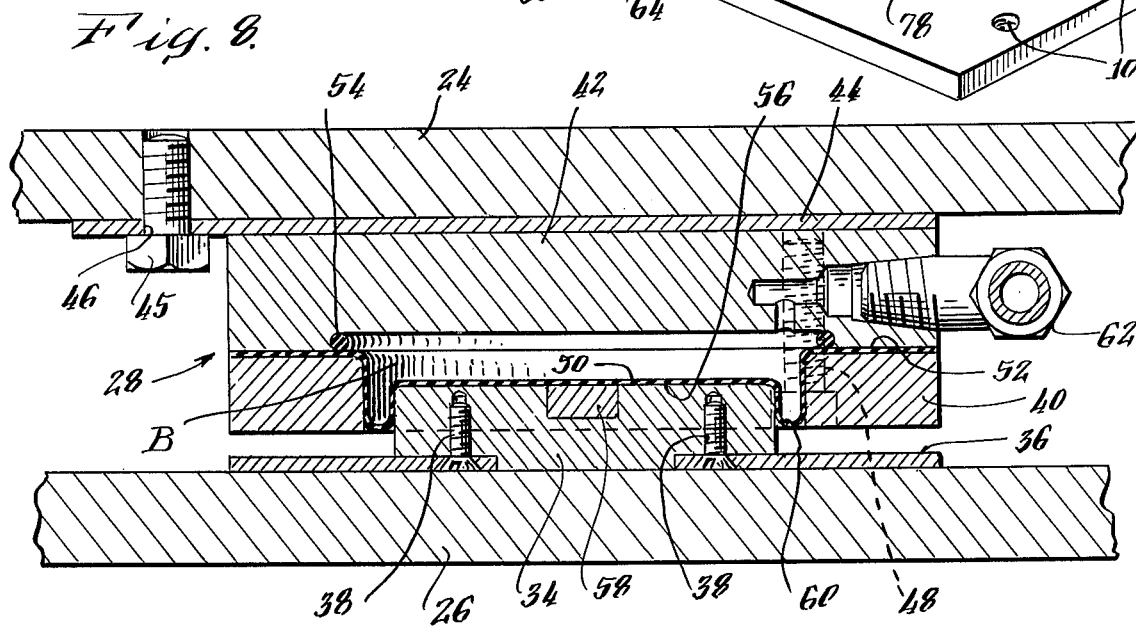
FIG. 8 is a vertical cross-sectional view taken through plane 8—8 in FIG. 4.

Each load cell, illustrated in detail in FIG. 8, is of the general type described in U.S. Pat. No. 3,089,518 (Bradley), assigned to the assignee of the present invention, and comprises a cylindrical, upwardly directed piston 34 which is surrounded by a flat centering ring 36 secured thereto by bolts 38. The centering ring rests on the upper surface of frame structure 26 and is free from attachment thereto. The piston is loosely enclosed by an annular collar 40 which, in turn, is backed up by a cylindrical pressure block 42.

As can be seen in FIGS. 4 and 8, the pressure block is provided with an attached rectangular top 44 plate having two mounting holes 46 drilled through diagonally opposing corners thereof. Two bolts 45, one of which is shown in FIG. 8, secure the pressure block through the top 44 to the under surface of the platform structure 24.

A set of bolts 48, only one of which is shown in FIG. 8, secures the collar to the pressure plate and a cup-shaped, flexible diaphragm 50 formed of a fluid impervious pliable plastic material, which includes an outer flange 52, is clamped between the collar and the pressure plate by the bolts 48. A fluid tight seal between diaphragm flange 52 and pressure block 42 is assured by O-ring 54.

The central portion of the diaphragm 50 depends in cup-like fashion from the flange 52 to provide a flattened circular portion 56 which lies on the upper surface of the piston and is centered thereon by an attached centering button 58. The diaphragm also forms a depending annular loop 60 which interlies between the opposed lateral walls of the piston and collar. Accordingly, the diaphragm forms a friction-free hydraulic seal for the space between the piston and pressure plate.

At its periphery, each load cell is provided with an outlet from the space B defined between the piston and pressure block, which terminates in a connector 62. This connector as well as that in each of the other load cells is coupled to a fluid line which leads to a measuring instrument or totalizer.

Thus, as can be seen from the FIGURES, when the frame and platform structures are loaded or unloaded with greater or lesser force, the load cell fluid pressure proportionally increases or decreases. The proportional pressure signal is conducted from each load cell to the totalizer, which yields a total output signal.

The bracing arrangement 30, which is illustrated in greater detail in FIGS. 4 through 7, comprises two mechanical linkages generally indicated at 64 and 66, which, as noted above, permit limited vertical movement of the platform structure relative to the frame structure but which substantially prevents relative horizontal movement of the two structures. Thus, each of the two mechanical linkages has flexibility in the vertical direction but is essentially unyielding in the horizontal direction.

Each linkage includes an assembly or bundle 68 and 70 of thin, flexible strips which extend in the longitudinal direction of each of the platform and frame structures. The principle dimension of each of the several strips lies in the horizontal plane. One end of the first linkage 64 is secured to the underside of the platform structure 24 in the region of the load cell 28. In the preferred embodiment, this secure attachment is achieved by mating clamp plates 72 and 74 which clamp about the end of the linkage and are secured together by two bolts 76 that pass downwardly through the platform structure 24. The lower clamp plate 72 terminates a short distance from the upper surface of frame structure 26 so as not to interfere with the vertical movement of the respective frame and platform structures.

The other end of the first mechanical linkage 64 is secured to the frame structure 26 by similar clamp plates 78 and 80 held together by two bolts 82 at the end of the platform and frame structures opposite the load cell. These bolts are accessible from above the weighing apparatus module through enlarged holes 84 drilled through the platform structure 24 so as not to interfere with relative vertical structure movement.

In order to provide stability of movement of the platform and frame structures and in order to permit the modular weighing apparatus to be completely self-contained, the second mechanical linkage is secured to the respective structures in a manner that is reversed to that of the first linkage. Specifically, the first end of the second linkage 66 is secured to the frame structure between two clamp plates 86 and 88 by machine bolts 90 which are accessible from above the platform structure through enlarged holes 92. The remote end of linkage 70 is secured to the platform structure by clamp plates 94 and 96 by bolts 98. Thus, horizontal movement between the frame and platform structures are resisted by the complementary linkages.

Relative disengagement of the frame and platform structures is prevented by the configuration of the clamp plates securing the respective linkages to the extreme end of these respective structures. As can be seen in FIGS. 6 and 7, clamp plate 80 is formed with a sidewardly extending finger 100 and clamp plate 96 is similarly formed with an oppositely, sidewardly extending finger 102 positioned beneath finger 100. Clamp plates 72 and 88 have similar interlocking fingers 103 and 105 respectively so that relative separating vertical movement and thus disengagement of the respective platform and frame structures is prevented.

Each weighing apparatus module, thus, has two stabilizing bracing assemblies in side by side relation, each assembly being free, by virtue of its laminated construction, to flex readily in the vertical direction so as to permit substantially unrestrained up and down motion of the platform. However, any attempt at horizontal motion of the platform in relation to the frame structure will place one or more of the strip assemblies in tension, a condition in which horizontal platform movement will be substantially prevented. Placing any one strip in an assembly in tension will, in theory, place an oppositely located strip in a bundle in compression. However, the tensile strength of the strip materials employed is so great that the actual compression of the paired strips will be inconsequential, and in no event be great enough to cause their buckling or other destructive distortion. It has been found, for example, that a bundle of four stainless steel strips, each two inches wide and 1/16 inch thick is effective. However, depending on the application to which the module will be put, more strips may be employed or the dimensions of the strips may be varied as required.

As can be seen in FIG. 4, the frame structure 26 has slightly larger dimensions than the platform structure 24. Moreover, at its end opposite the load cell 28, the frame structure is formed with two coupling holes 104. Further, two more coupling holes 106 spaced by a distance equal to the spacing of the first holes 104, are disposed through the frame structure along its upper edge adjacent the hydraulic load cell 28. These holes are engagable by bolts 108 which pass through lower tie plates 22 to link a number of the weighing apparatus modules together in a fashion such as that illustrated in FIG. 3.

Figure 9:
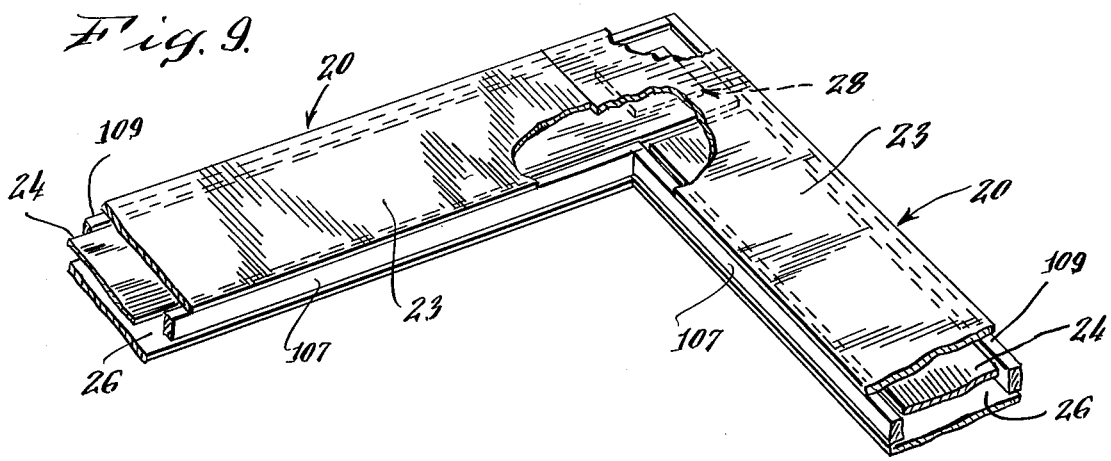
FIG. 9 is a perspective view of one corner of the weighing apparatus showing the upper tie plate arrangement in detail.

Assembly of the modules is completed by upper tie plates 23 which can be seen in FIGS. 3 and 9. Each upper tie plate overlies a portion of the platform structure of one module in the region of its load cell and the remainder of the platform structure of an adjacent module. Thus, if the modules are seen to be arranged to extend from a corner of the assembled apparatus in a counterclockwise sense, each upper tie plate 23 extends from a corner of the apparatus in a clockwise sense. Each upper tie plate, moreover, is located as described above by depending inner 107 and outer 109 rails which embrace the portions of the platform structure of the modules which it overlies. Secure attachment is completed by bolts 113 which pass downwardly into the platform structures from the tie plates 23.

The weighing apparatus may be anchored to a support structure by any suitable bolts such as masonry anchors which pass through holes 115 in frame structure extensions 117.

After the modules are assembled as shown in FIG. 3, a branch of tubing 112 is connected to the connector 62 of each of the independent load cells and is conducted to a junction box 114 mounted on the outside of one module. Each of the tubes 112 is then connected by suitable additional piping (not shown) to the totalizer which measures the total load.

Each cell may also be filled by pumping hydraulic fluid back through tubes 112 to the space B in each cell which is vented by a vent fitting 116.

As will be appreciated from the description, each module is independently replaceable and repairable. To do so, the tie plates 22 and 23 connecting it to the two adjacent modules need only be disengaged and the hydraulic tube 112 disconnected from the associated load cell. Further, it can be appreciated that the dimensions of the entire load weighing apparatus may be easily varied by substituting tie plates having different lengths. Thus, a square weighing platform may be formed such as that shown in FIG. 3. However, a rectangular weighing platform may be easily assembled by removing the tie plates 22a, 22c, 23a and 23c and substituting tie plates having different lengths. This arrangement, then, provides an easily maintained as well as versatile weighing apparatus.

Accordingly, although a preferred embodiment of the modular weighing apparatus of the present invention has been described above in detail, it is to be understood that this is for purposes of illustration. Modifications may be made to the described structure by those skilled in the art in order to adapt this weighing apparatus to particular weighing applications.

What is claimed is:

1. A module adapted for assembly with similar modules to form a weighing apparatus, said module comprising:
   A. an elongated platform structure;
   B. an elongated frame structure underlying said platform structure;
   C. load cell means interposed between downwardly directed areas of said platform structure and upwardly directed areas of said frame structure in the region of one end of both said platform and frame structures;
D. bracing means for resisting horizontal displacement but permitting vertical displacement of said platform structure relative to said frame structure, said bracing means including:
1. a first mechanical linkage, flexible in the vertical direction but substantially inflexible in the horizontal direction, having
   a. a first fixed connection to said frame structure in the region of said load cell, and
   b. a second fixed connection to said platform structure in the region of the other end of both said platform and frame structures; and
2. a second mechanical linkage, flexible in the vertical direction but substantially inflexible in the horizontal direction, extending in side-by-side relation to said first mechanical linkage and having:
   a. a first fixed connection to said platform structure in the region of said load cell, and
   b. a second fixed connection to said frame structure in the region of the other end of both said platform and frame structures.

2. The weighing apparatus module as claimed in claim 1 wherein said first and second mechanical linkages comprise:
a bundle of thin flexible strips each having the major dimensions of its length and width in the horizontal plane.

3. The weighing apparatus module as claimed in claim 1 further comprising:
attachment means for linking one module to another to form the weighing apparatus.

4. The weighing apparatus module as claimed in claim 1 further comprising:
means for limiting the amount by which said frame and platform structures may vertically be separated.

5. The weighing apparatus module as claimed in claim 4 wherein said limiting means comprises:
1. a first horizontally extending finger mounted with one of said platform and said frame structure, and
2. a second finger extending horizontally in a direction opposite to and interlocked with said first finger, mounted with the other of said platform and frame structures.

6. The weighing apparatus module as claimed in claim 1 wherein said load cell is positively attached to said platform structure but is free from attachment to said frame structure.

7. The weighing apparatus module as claimed in claim 1 wherein said first and second fixed connections of said first and second mechanical linkages are accessible from the top of said platform structure.

8. A weighing apparatus comprising:
A. a plurality of weighing apparatus modules, each including:
   1. a rectangular elongated platform structure having a planar upper surface;
   2. a generally rectangular, elongated frame structure underlying said platform structure,
   3. a load cell interposed between downwardly directed areas of said platform structure and upwardly directed areas of said frame structure in the region of one end of both said platform and frame structures,
   4. bracing means for resisting horizontal displacement but permitting vertical displacement of said platform structure relative to said frame structure, said bracing means including:
      a. a first mechanical linkage flexible in the vertical direction but substantially inflexible in the horizontal direction having
         (1) a first fixed connection to said frame structure in the region of said load cell, and
         (2) a second fixed connection to said platform structure in the region of the other end of both said platform and frame structures, and
      b. a second mechanical linkage, flexible in the vertical direction but substantially inflexible in the horizontal direction, extending in mutually parallel relation to said first mechanical linkage and having
         (1) a first fixed connection to said platform structure in the region of said load cell, and
         (2) a second fixed connection to said frame structure in the region of the other end of both said platform and frame structures, and
B. attachment means for linking one of said modules at its side in the region of said load cell to another of said modules at its end in the region spaced from said load cell to form a corner at which said load cell of said one module is located.

9. The weighing apparatus as claimed in claim 8 wherein said attachment means comprises:
tie plate means rigidly attached to said one and said other module to span the distance therebetween.

10. The weighing aparatus as claimed in claim 9 wherein said tie plate means comprises:
a lower tie plate linking the frame structure of said one module to the frame structure of said other module.

11. The weighing apparatus as claimed in claim 9 wherein said tie plate means comprises:
an upper tie plate linking the platform structure of said one module to the platform structure of said other module.

12. The weighing apparatus as claimed in claim 11 wherein said upper tie plate overlies a first portion of the platform structure of said one module and a second portion of the platform structure of said other module, and wherein said tie plate means further comprises:
side rails depending from at least part of the edges of said upper tie plate to embrace the sides of the module platform structure portions which it overlies.

* * * * *